United States Patent
Liu et al.

(10) Patent No.: US 12,387,499 B2
(45) Date of Patent: Aug. 12, 2025

(54) IMAGE IDENTIFICATION METHOD AND IMAGE SURVEILLANCE APPARATUS

(71) Applicant: VIVOTEK INC., New Taipei (TW)

(72) Inventors: Cheng-Chieh Liu, New Taipei (TW);
Shun-Hsun Yu, New Taipei (TW);
Fu-Min Wang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 428 days.

(21) Appl. No.: 17/851,060

(22) Filed: Jun. 28, 2022

(65) Prior Publication Data
US 2022/0415055 A1    Dec. 29, 2022

(30) Foreign Application Priority Data

Jun. 29, 2021   (TW) .................................. 110123799

(51) Int. Cl.
*G06V 20/54*   (2022.01)
*G06T 7/215*   (2017.01)
*G06T 11/00*   (2006.01)
*G06V 10/22*   (2022.01)
*G06V 10/26*   (2022.01)

(52) U.S. Cl.
CPC .............. *G06V 20/54* (2022.01); *G06T 7/215* (2017.01); *G06T 11/00* (2013.01); *G06V 10/225* (2022.01); *G06V 10/26* (2022.01); *G06T 2210/12* (2013.01)

(58) Field of Classification Search
CPC ...... G06V 20/54; G06V 10/225; G06V 10/26; G06V 10/255; G06V 2201/07; G06V 20/52; G06V 40/10; G06T 7/215; G06T 11/00; G06T 2210/12; G06T 2207/30232; G06T 7/254; G06T 7/246

USPC ......................................................... 382/103
See application file for complete search history.

(56) References Cited

U.S. PATENT DOCUMENTS

| | | | |
|---|---|---|---|
| 9,430,715 B1* | 8/2016 | Wang | G06T 5/94 |
| 11,282,235 B2* | 3/2022 | Torikura | G06V 20/56 |
| 11,628,855 B1* | 4/2023 | Pradhan | G01S 17/58 |
| | | | 701/24 |
| 12,026,975 B2* | 7/2024 | McDonald | G06V 10/454 |
| 2013/0038628 A1* | 2/2013 | Look | G06V 10/245 |
| | | | 345/622 |

(Continued)

FOREIGN PATENT DOCUMENTS

CN    111667030 A    9/2020
CN    112464717 A    3/2021

*Primary Examiner* — Chineyere Wills-Burns
*Assistant Examiner* — Aaron Timothy Bonansinga
(74) *Attorney, Agent, or Firm* — Winston Hsu

(57) ABSTRACT

An image identification method is applied to an image surveillance apparatus and includes utilizing an object detecting function to generate a first bounding box and a second bounding box within a surveillance image, utilizing a foreground detecting function to generate a plurality of markers within the surveillance image, defining some of the plurality of markers which conform to the first bounding box as a first marker group and further defining other markers which do not conform to the first bounding box as a second marker group, determining whether the second marker group conforms to the second bounding box, and deciding whether the second bounding box belongs to an error of the object detecting function in accordance with a determination result.

18 Claims, 9 Drawing Sheets

(56) References Cited

U.S. PATENT DOCUMENTS

| | | | |
|---|---|---|---|
| 2013/0051613 A1* | 2/2013 | Bobbitt | G06V 20/52 382/103 |
| 2014/0112546 A1* | 4/2014 | Lee | G08B 13/19676 382/107 |
| 2014/0347475 A1* | 11/2014 | Divakaran | G06V 20/52 348/135 |
| 2016/0117824 A1* | 4/2016 | Amma | G06T 7/73 382/103 |
| 2018/0172454 A1* | 6/2018 | Ghadiok | G01C 21/005 |
| 2019/0303686 A1* | 10/2019 | Guo | G06V 10/75 |
| 2020/0175311 A1* | 6/2020 | Xu | G06V 10/82 |
| 2021/0031775 A1* | 2/2021 | Noma | B60W 40/06 |
| 2021/0166049 A1* | 6/2021 | Tariq | G06V 10/25 |
| 2021/0209797 A1* | 7/2021 | Lee | G06T 17/00 |
| 2021/0356599 A1* | 11/2021 | Liu | B60W 60/0011 |
| 2022/0027675 A1* | 1/2022 | Sheu | G01S 17/931 |
| 2022/0206162 A1* | 6/2022 | Chen | G08G 1/166 |
| 2022/0287530 A1* | 9/2022 | Xi | G06V 20/64 |
| 2022/0300001 A1* | 9/2022 | Gayaka | G10L 15/08 |
| 2022/0335725 A1* | 10/2022 | Taheri | G06V 10/46 |
| 2022/0391621 A1* | 12/2022 | Chen | G06V 20/52 |

\* cited by examiner

IMAGE IDENTIFICATION METHOD AND IMAGE SURVEILLANCE APPARATUS

BACKGROUND OF THE INVENTION

1. Field of the Invention

The present invention relates to an image identification method and a related image surveillance apparatus, and more particularly, to an image identification method of decreasing identification error and a related image surveillance apparatus.

2. Description of the Prior Art

A conventional camera utilizes an object detection function to detect whether a surveillance image has a target object passing through a surveillance range. The object detection function extracts pattern features of each target object in the surveillance image for feature comparison via deep learning or other method, so as to find out the target object in the surveillance image. The conventional camera is used to detect a number and a path of the people or the vehicle. For increasing accuracy of the object detection function, the conventional camera utilizes the foreground detection function to identify the static object and the moving object in the surveillance image, so as to prevent the static vehicle from being misunderstanding as the moving object. However, if the moving person or the moving vehicle passes by the static object, the foreground detection function is difficult to distinguish the foreground variation data belongs to the foreground of the moving object or the static object, and the static object may be misunderstood as the moving object and results in an error of the object detection function. Therefore, design of a camera and an identification method of decreasing the identification error by accurately setting the static object as a static background object when the moving object passes by the static object is an important issue in the related camera industry.

SUMMARY OF THE INVENTION

The present invention provides an image identification method of decreasing identification error and a related image surveillance apparatus for solving above drawbacks.

According to the claimed invention, an image identification method of decreasing identification error is disclosed. The image identification method includes utilizing an object detecting function to generate a first bounding box and a second bounding box within a surveillance image, utilizing a foreground detecting function to generate a plurality of markers within the surveillance image, defining some specific markers of the plurality of markers which conform to the first bounding box as a first marker group and further defining other excluded markers which do not conform to the first bounding box as a second marker group, determining whether the second marker group conforms to the second bounding box, and determining whether the second marker group conforms to the second bounding box; and According to the claimed invention, an image surveillance apparatus includes an image receiver and an operation processor. The image receiver is adapted to acquire a surveillance image. The operation processor is electrically connected to the image receiver. The operation processor is adapted to utilize an object detecting function to generate a first bounding box and a second bounding box within the surveillance image, utilize a foreground detecting function to generate a plurality of markers within the surveillance image, define some specific markers of the plurality of markers which conform to the first bounding box as a first marker group and further defining other excluded markers which do not conform to the first bounding box as a second marker group, determine whether the second marker group conforms to the second bounding box, and decide whether the second bounding box belongs to an error of the object detecting function in accordance with a determination result.

The image identification method and the image surveillance apparatus of the present invention can utilize the object detecting function and the foreground detecting function to acquire the bounding box and the marker relevant to the target object within the surveillance image, and decide how to divide the plurality of markers into the first marker group composed of the specific markers and the second marker group composed of the excluded markers in accordance with an overlapped degree between the markers and the bounding box. The specific marker can be used to decide whether the target object within the first bounding box belongs to the moving object, and is no long used to compare with the target object within the second bounding box. The excluded marker may be the foreground variation resulted by the shadow of the target object corresponding to the specific marker, and is still compared with the second bounding box for determining whether the target object within the second bounding box is excluded or represents the correct detection result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
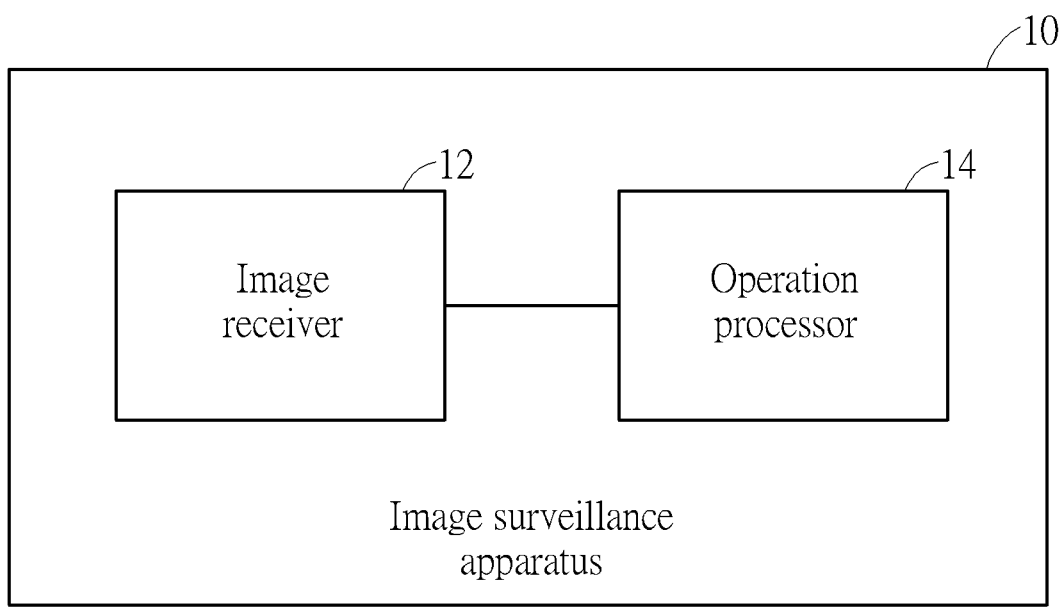
FIG. 1 is a functional block diagram of an image surveillance apparatus according to an embodiment of the present invention.
Figure 2:
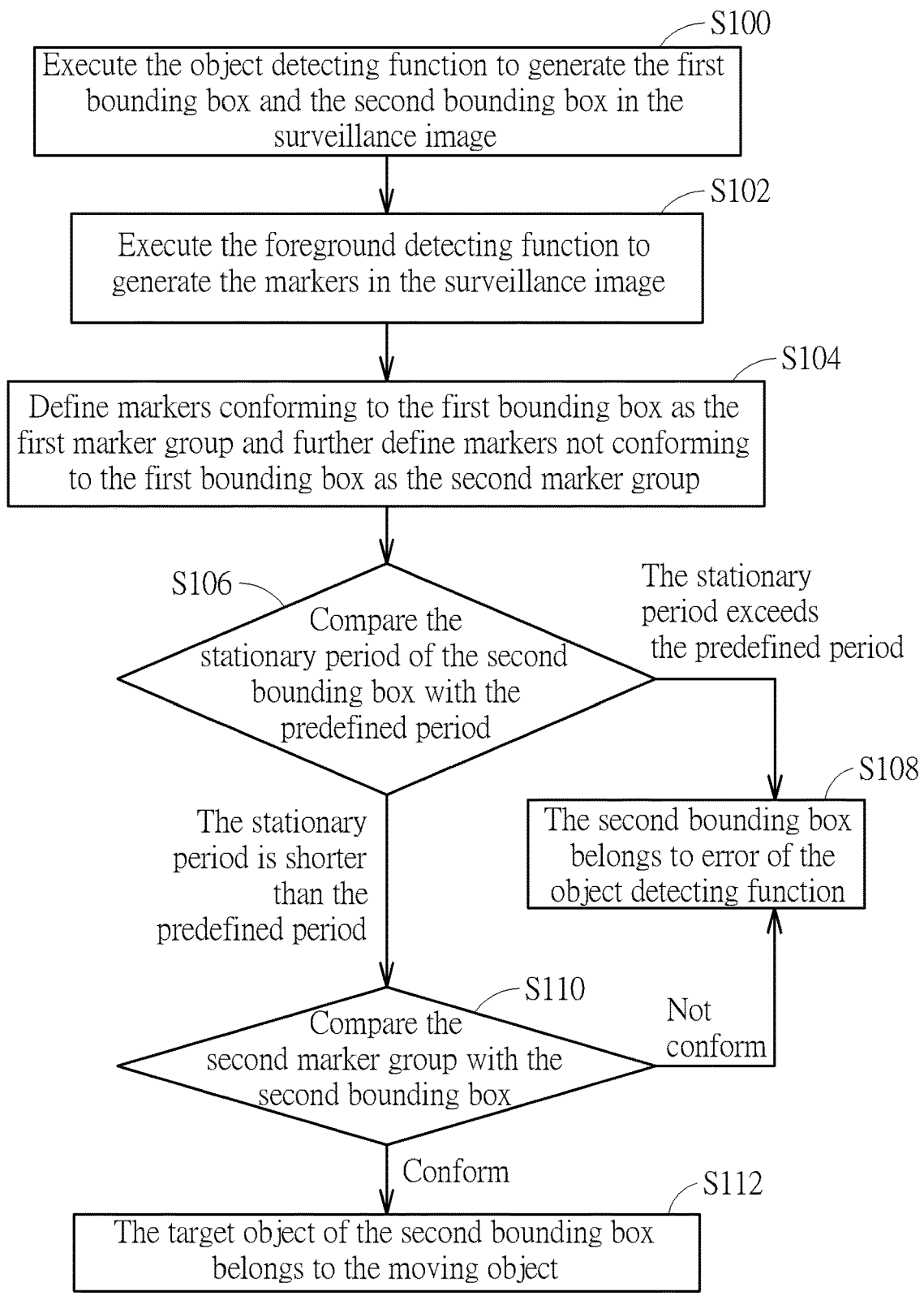
FIG. 2 is a flow chart of an image identification method according to the embodiment of the present invention.

Please refer to FIG. 1 to FIG. 6. FIG. 1 is a functional block diagram of an image surveillance apparatus 10 according to an embodiment of the present invention. FIG. 2 is a flow chart of an image identification method according to the embodiment of the present invention. FIG. 3 to FIG. 6 are diagrams of a surveillance image I applied to the image identification method in different identification modes according to the embodiment of the present invention. The image surveillance apparatus 10 can include an image receiver 12 and an operation processor 14 electrically connected with each other. The image receiver 12 can capture the surveillance image I, or receive the surveillance image I captured by an external camera. The operation processor 14 can execute the image identification method, and therefore the image identification method illustrated in FIG. 2 can be suitable for the image surveillance apparatus 10 shown in FIG. 1.

Figure 3:
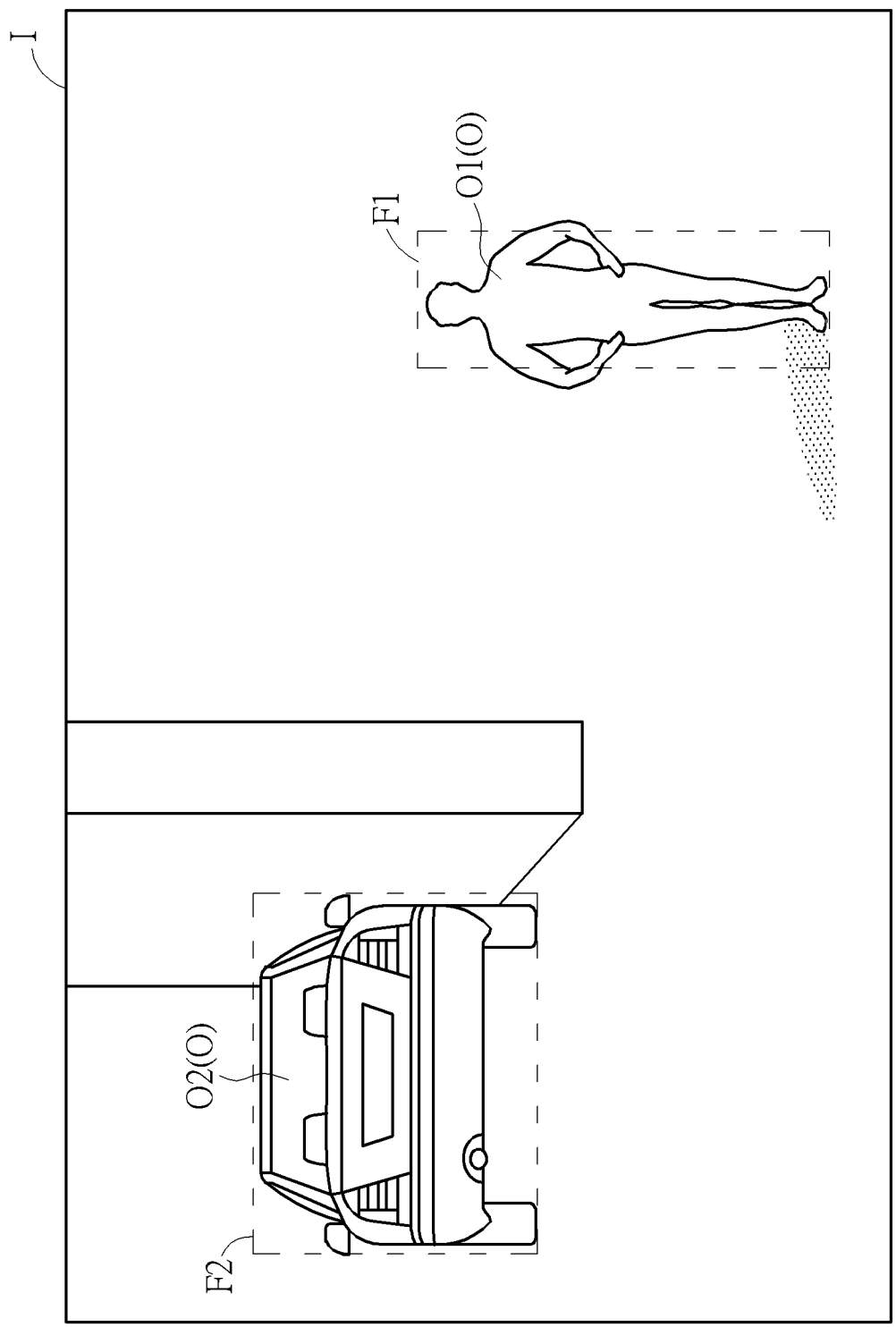
FIG. 3 to FIG. 6 are diagrams of a surveillance image applied to the image identification method in different identification modes according to the embodiment of the present invention.
Figure 4:
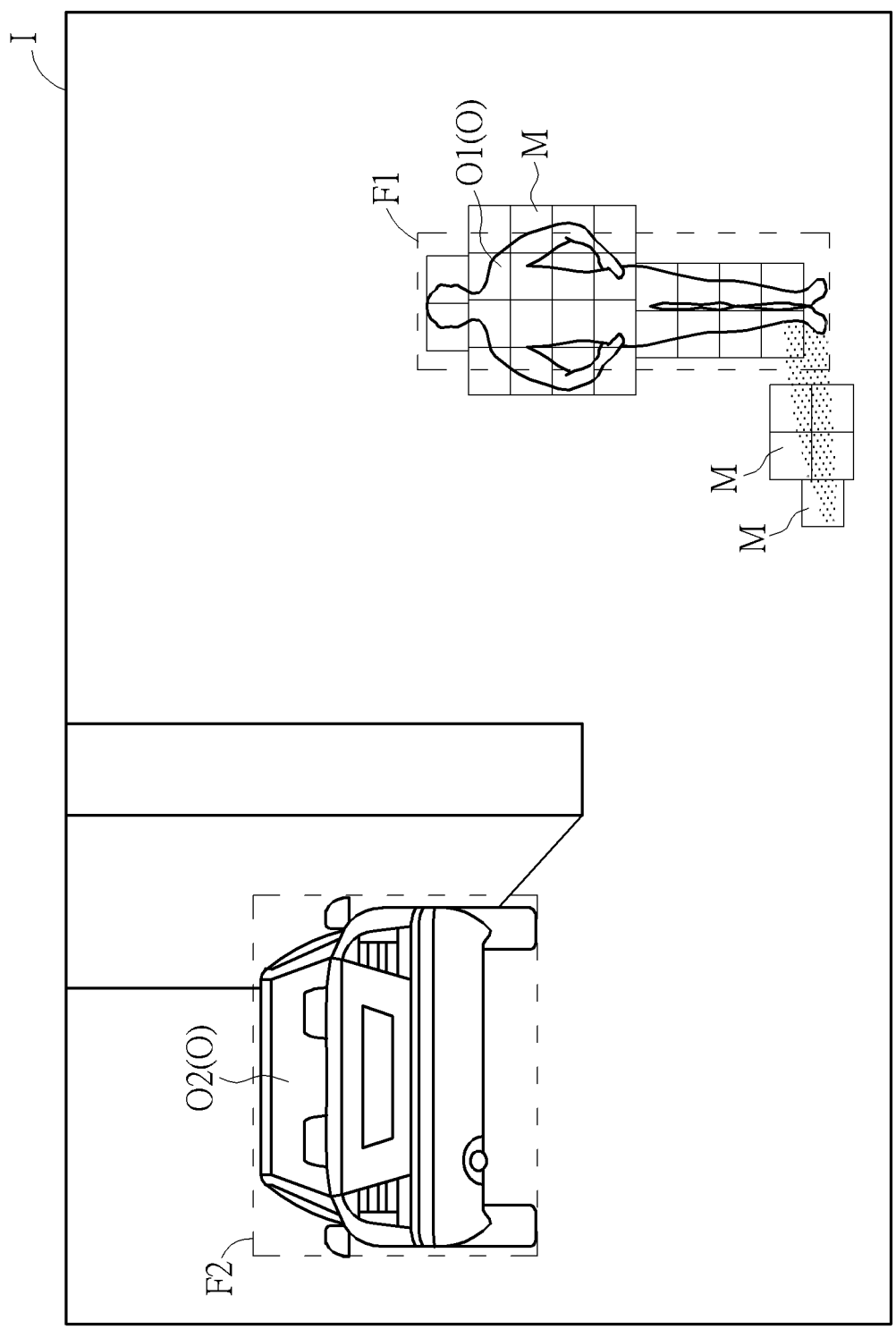

The image surveillance apparatus 10 can search a target object O within a surveillance range of the image surveillance apparatus 10, and accurately identify an object difference between several categories or several statuses of the object. The following embodiment shows how to identify difference between a moving object and a static object. First, the object detecting function can be utilized to find out the target objects O1 and O2 which conform to a predefined feature within the surveillance image I; as shown in FIG. 3, the target object O1 can be the moving object, and the target object O2 can be the static object. In the embodiment, the moving object and the static object can respectively be a pedestrian and a motionless vehicle, which depend on an actual application. Then, the foreground detecting function can be utilized to find out foreground variation information within the surveillance image I; as shown in FIG. 4, only the target object O1 contains the foreground variation information, and the target object O2 can be determined as the static object.

Figure 6:
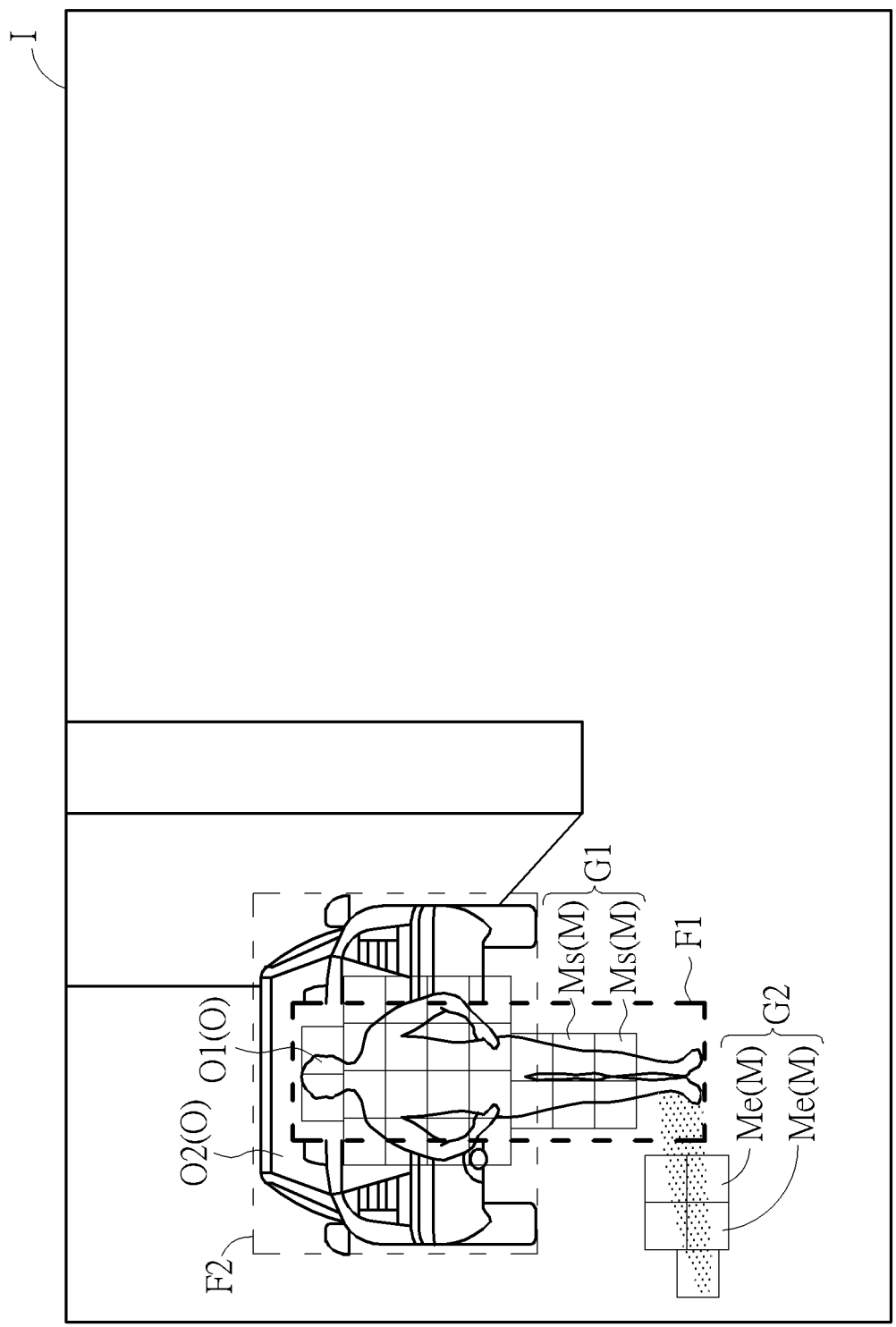

However, if the target object O1 is moved to position close to the target object O2, as shown in FIG. 6, the foreground variation information of the target object O1 detected by the foreground detecting function may be partly overlapped with the target object O2. For preventing the image surveillance apparatus 10 from misunderstanding that the target object O2 belongs to the moving object, the image identification method of the present invention can accurately exclude the target object O that does not belong to the moving object, which means the target object O2, via classification and analysis of the foreground variation information detected by the foreground detecting function, so that the image surveillance apparatus 10 can have the preferred object detecting function.

First, step S100 can be executed to apply the object detecting function for the surveillance image I to determine whether the target object O is appeared in the surveillance range. If the object detecting function detects the target object O, a related bounding box can be generated within the surveillance image I in accordance with position of the target object O. As shown in FIG. 3, the object detecting function can detect the target objects O1 and O2 inside the surveillance image I, and then generate a corresponding first bounding box F1 and a corresponding second bounding box F2. Step S102 can be executed to apply the foreground detecting function for the surveillance image I to determine whether the surveillance image I contains foreground variation. If the foreground detecting function detects the foreground variation of the target object O1, one or some markers M can be generated in accordance with the position of the target object O1, as shown in FIG. 4. A size of the marker M can be smaller than a size of the target object O1. The surveillance image I may have a plurality of markers M, and an actual number of the markers M can depend on the size of the target object O1.

Figure 7:
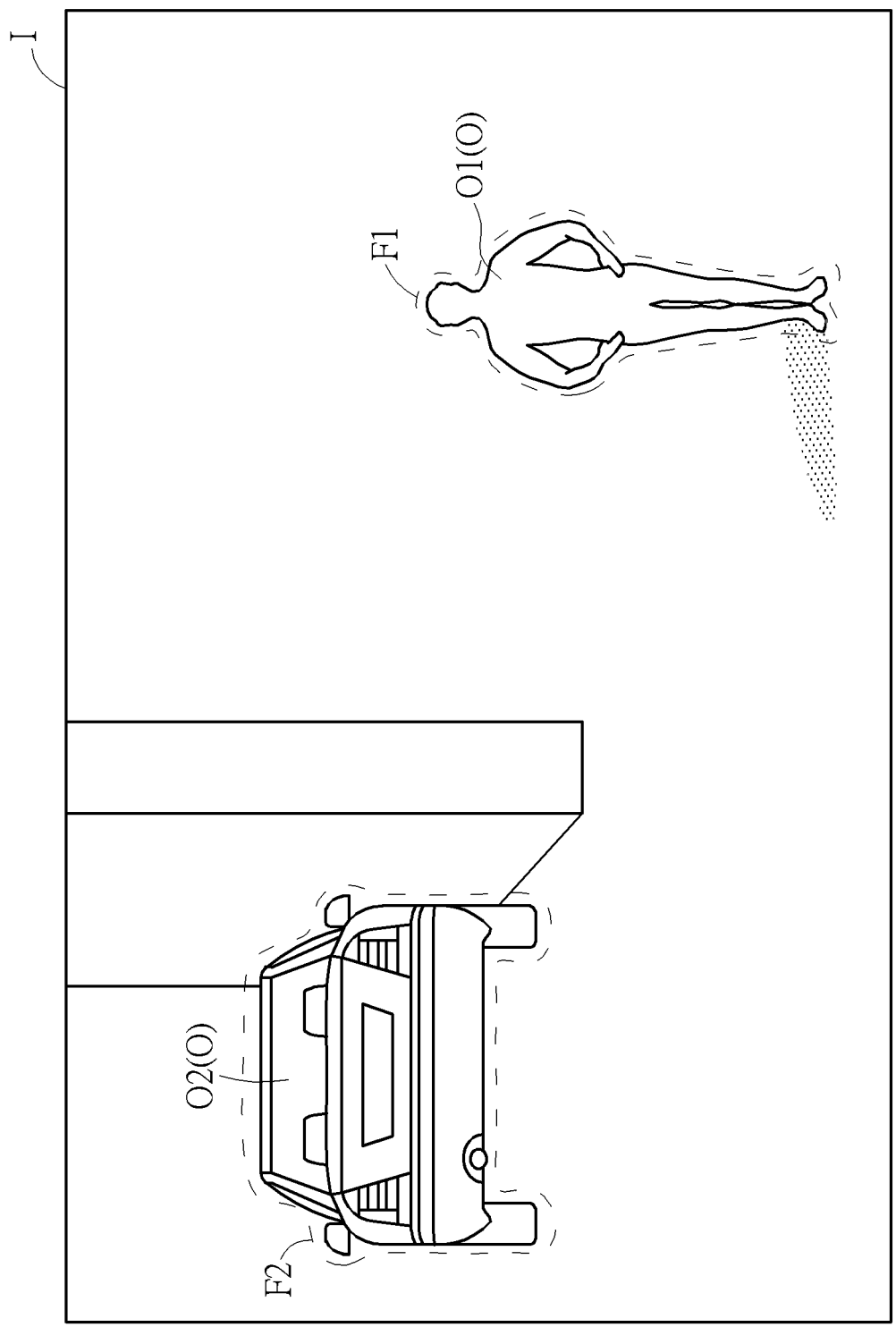
FIG. 7 to FIG. 9 are diagrams of a first bounding box and a second bounding box according to different embodiments of the present invention.
Figure 8:
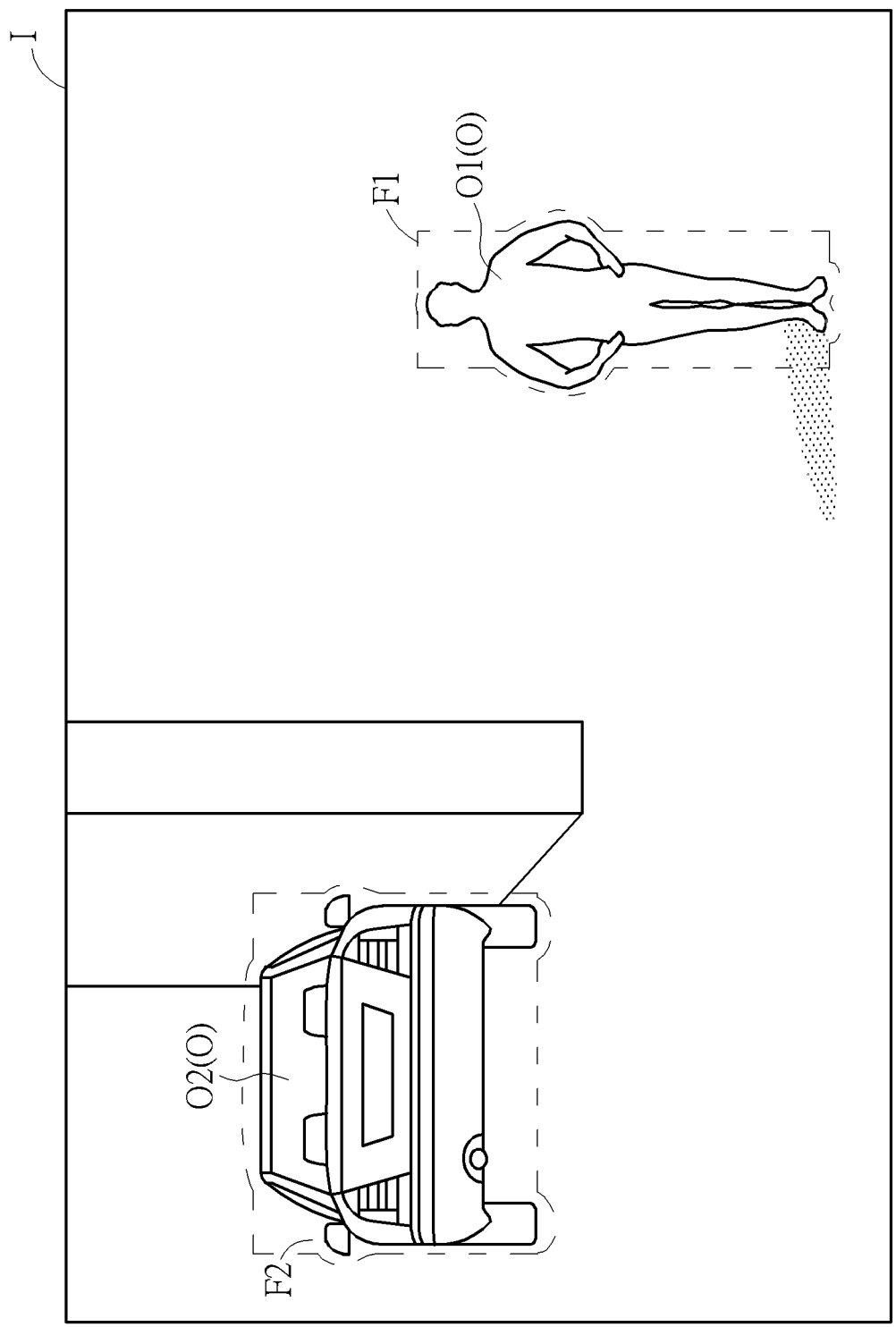
Figure 9:
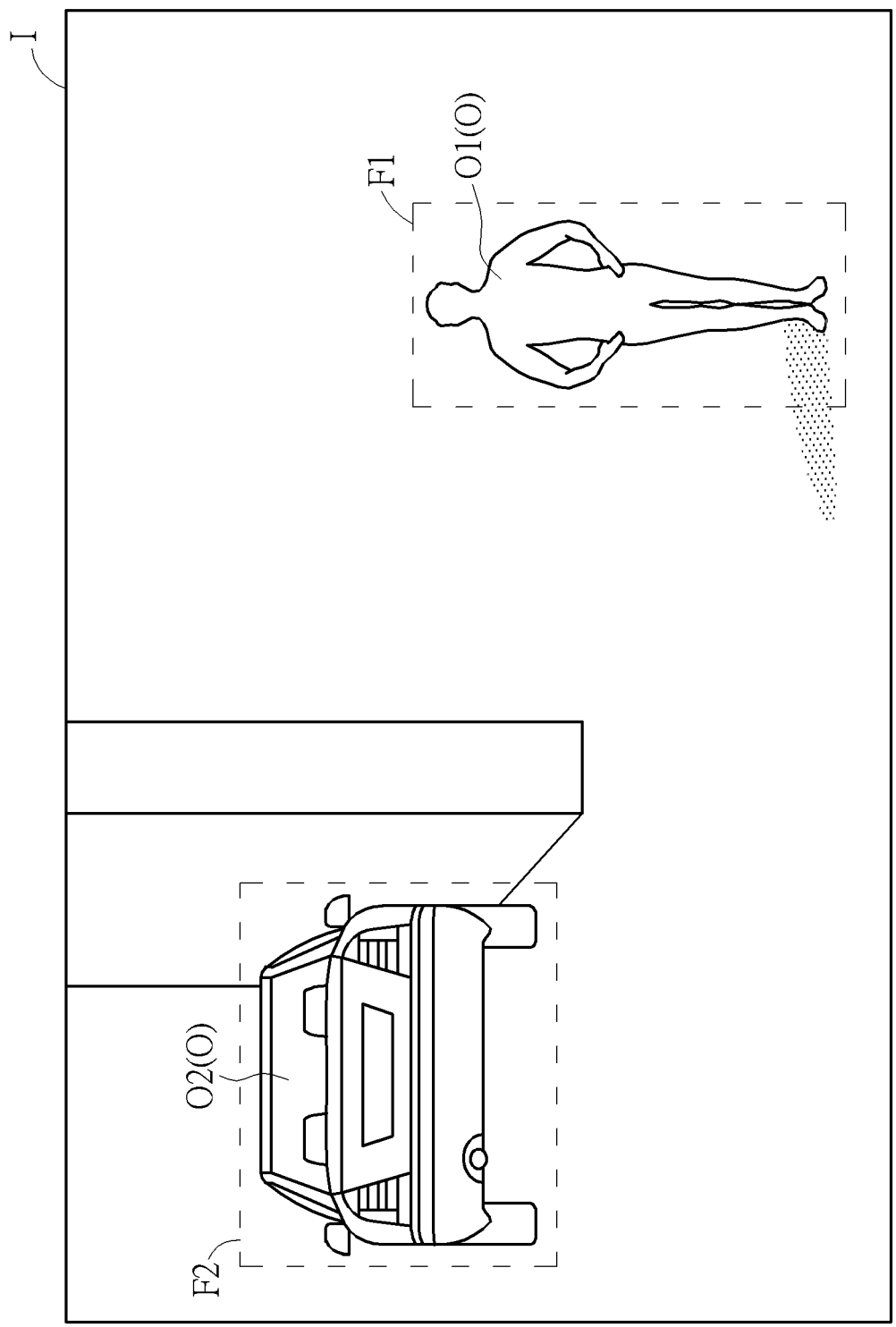

In step S100, the object detecting function can detect the target object O, and the image identification method can draw a rectangular bounding box around the target object O for setting as a bounding box, such as the first bounding box F1 and the second bounding box F2 shown in FIG. 3. A drawing method of the bounding box is not limited to the foresaid embodiment. Please refer to FIG. 7 to FIG. 9. FIG. 7 to FIG. 9 are diagrams of the first bounding box F1 and the second bounding box F2 according to different embodiments of the present invention. As shown in FIG. 7, the image identification method can identify and draw the contours of the target objects O1 and O2, and the contours can be set as the first bounding box F1 and the second bounding box F2.

As shown in FIG. 8, the image identification method can draw the rectangular bounding box around the target objects O1 and O2, and further draw the contours of the target objects O1 and O2, and utilizes a maximal combined range of each rectangular bounding box and the corresponding contour to set each of the first bounding box F1 and the second bounding box F2. As shown in FIG. 9, the image identification method can draw the rectangular bounding boxes and the contours in accordance with the target objects O1 and O2, and enlarge the initial rectangular bounding box in accordance with the contour for setting as the first bounding box F1 and the second bounding box F2. For example, the initial rectangular bounding box drawn by the object detecting function can be the first rectangular bounding box, and each edge of the first rectangular bounding box can be shifted to align with the contour for generating the second rectangular bounding box; the second rectangular bounding box is the demanded bounding box.

In step S102, the foreground detecting function can divide the surveillance image I into a plurality of pixel areas, and compare each pixel area between the surveillance image I and a reference image to decide whether the each pixel area has variation of pixel computed values satisfied with a preset condition. If one pixel area has the variation of the pixel computed values satisfied with the preset condition, the pixel area contains the foreground variation and the markers M are generated accordingly. In the present invention, the reference image can represent a preset image that has no target object appeared within the surveillance range of the image surveillance apparatus 10, and can be pre-stored in a memory unit (which is not shown in the figures) of the image surveillance apparatus 10. In addition, a size of each pixel area can depend on a design demand, and a detailed description is omitted herein for simplicity. The pixel computed value can be an amount of pixel values, an average of pixel values or any possible computed values of each pixel area. The preset condition can be a value threshold; any pixel computed value that exceeds the value threshold can be interpreted as satisfying with the preset condition.

It should be mentioned that the object detecting function in step S100 and the foreground detecting function in step S102 can execute detection and identification for the whole surveillance image I; further, a region of interest (which is not shown in the figures) may be optionally drawn in the surveillance image I, and the object detecting function and the foreground detecting function can be executed within the region of interest for decreasing a computation quantity. The region of interest can be drawn manually or automatically in accordance with a detection result of the image surveillance apparatus 10. A shape, a position and a size of the region of interest can depend on the design demand. For example, the region of interest may be a rectangular form located at some area where the target object possibly appears within the surveillance range, such as the door or the lane, which depend on the actual demand.

Figure 5:
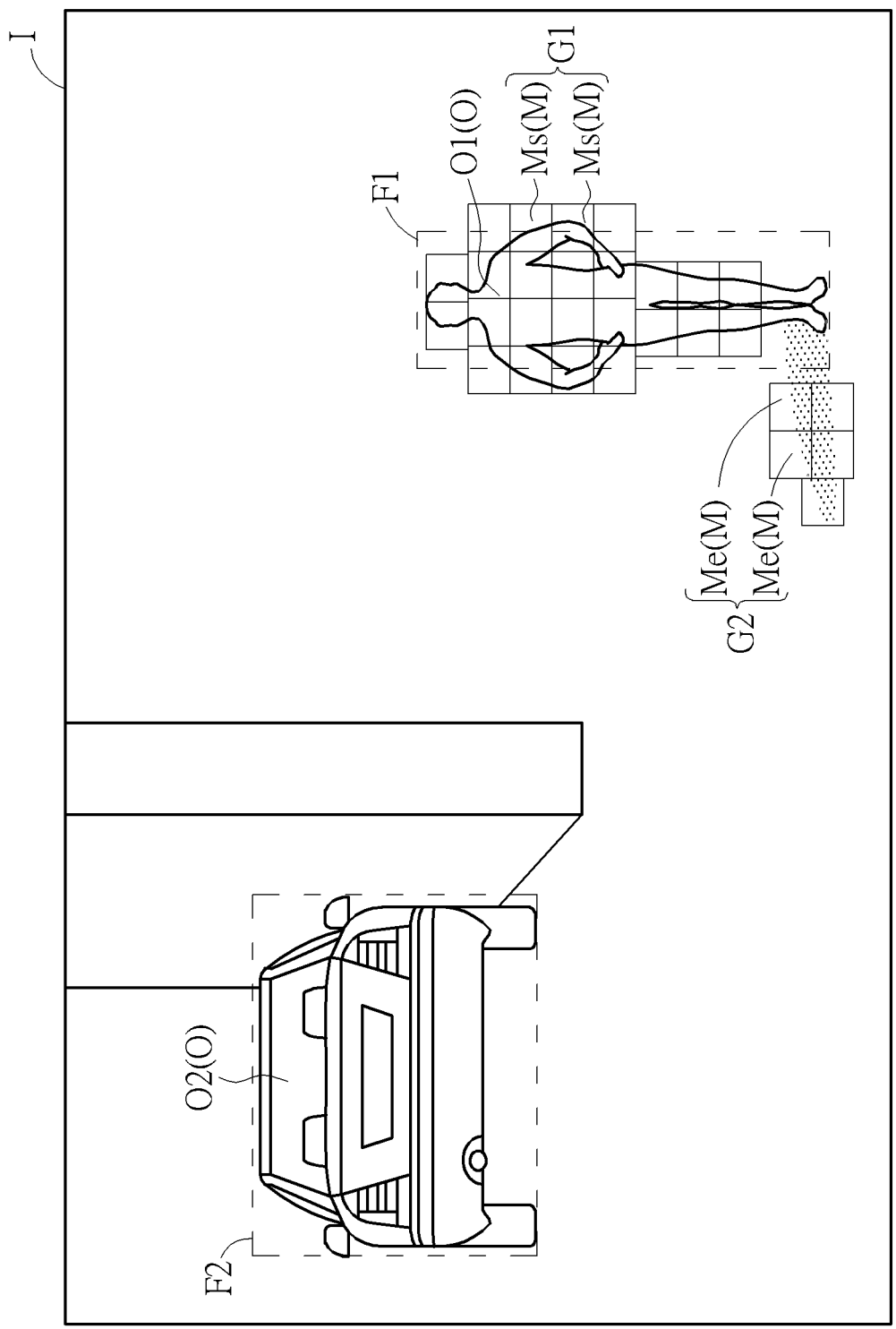

Then, step S104 can be executed to compare the plurality of markers M with the first bounding box F1. Some specific markers Ms in the plurality of markers M that conform to the first bounding box F1 can be defined as a first marker group G1, and some excluded marker Me in the plurality of markers M that do not conform to the first bounding box F1 can be defined as a second marker group G2, as shown in FIG. 5. In the embodiment, the specific marker Ms can be interpreted as the marker M located inside the first bounding box F1, and therefore the specific marker Ms can conform to the first bounding box F1 and belong to the foreground variation information of the target object O1. Accordingly, the excluded marker Me can be interpreted as the marker M located outside the first bounding box F1, and the excluded marker Me may be foreground variation resulted by a shadow of the target object O1 so that the excluded marker Me does not conform to the first bounding box F1.

When the first bounding box F1 and the second bounding box F2 are not overlapped, the plurality of markers M can be clearly divided into the first marker group G1 (which means the specific marker Ms) conforming to the first bounding box F1 and the second marker group G2 (which means the excluded marker Me) not conforming to the first bounding box F1. However, if the first bounding box F1 and the second bounding box F2 are partly overlapped, one or some specific markers Ms of the first marker group G1 that are located inside the second bounding box F2 can be classified into the excluded marker Me of the second marker group G2, which means one marker M can have property of the specific marker Ms and the excluded marker Me, and can be applied to different steps for respectively determining whether the first bounding box F1 and the second bounding box F2 belong to an error of the object detecting function.

Then, step S106 can be optionally executed to compare a stationary period of the second bounding box F2 with a predefined period. If the stationary period exceeds the predefined period, the target object O2 of the second bounding box F2 are motionless and belongs to the static object, instead of the moving object, so that step S108 can be executed to determine the second bounding box F2 belongs to the error of the object detecting function. The predefined period can be pre-stored in the memory unit (which is not shown in the figures) of the image surveillance apparatus 10. A time length of the predefined period can depend on the behavior and the habit of the persons live in the place where the image surveillance apparatus 10 is installed, and the detailed description is omitted herein for simplicity.

If the stationary period is shorter than the predefined period, the target object O2 of the second bounding box F2 is not the static object, and step S110 can be executed to compare the second marker group G2 with the second bounding box F2, such as a number of the excluded marker Me of the second marker group G2 within the second bounding box F2 being compared with a threshold condition; the specific marker Ms can be classified into the foreground variation of the target object O1 and cannot be compared with the second bounding box F2. The threshold condition can be pre-stored in the memory unit (which is not shown in the figures) of the image surveillance apparatus 10, and an actual value of the threshold condition can depend on a resolution or other factors of the image surveillance apparatus 10. If the number of the excluded marker Me is greater than or equal to the threshold condition, the excluded marker Me of the second marker group G2 is irrelevant to the first marker group G1, and step S112 can be executed to determine the target object O2 of the second bounding box F2 belongs to the moving object. If the number of the excluded marker Me is smaller than the threshold condition, step S108 can be executed to determine the second bounding box F2 belongs to the error of the object detecting function.

The present invention can determine the second marker group G2 of the plurality of markers M belongs to a foreground detection result of the target object O1 within the first bounding box F1 or the target object O2 within the second bounding box F2. If the target object O1 has large shadow due to oblique illumination, the object detecting function can generate the corresponding first bounding box F1 in accordance with the target object O1, and the foreground detecting function can generate the plurality of markers M over the target object O1 and the related shadow. The plurality of markers M can be divided into the first marker group G1 and the second marker group G2. The first marker group G1 can belong to the foreground detection result of the target object O1. The image identification method can be utilized to determine that the second marker group G2 belongs to the foreground detection result of the shadow of the target object O1, or the foreground detection result of the target object O2.

For the above-mentioned identification function, the present invention provides several manners to determine whether the second marker group G2 conforms to the target object O2 of the second bounding box F2. The first embodiment of the image identification method can utilize the shadow detection function to identify whether the second marker group G2 is relevant to the first marker group G1, and then decide whether the second marker group G2 conforms to the second bounding box F2 in accordance with an identification result. Because hues and saturation of pixels in the shadow are similar to hues and saturation of pixels in the background within the surveillance image I, and brightness of the pixels in the shadow is lower than brightness of the pixels in the background, the shadow detection function can transform RGB color system of the surveillance image I into YUV color system for further identification.

The second embodiment of the image identification method can analyze whether a vector of the first marker group G1 is the same as a vector of the second marker group G2, and determine whether the second marker group G2 conforms to the second bounding box F2 in accordance with an analysis result. That is to say, if the vectors of the first marker group G1 and the second marker group G2 are the same, the second marker group G2 is relevant to and belongs to the shadow detection result of the first marker group G1; if the vectors of the first marker group G1 and the second marker group G2 are dissimilar, the second marker group G2 is independent of the first marker group G1 and conforms to the second bounding box F2.

The third embodiment of the image identification method can analyze continuity of the second marker group G2 relative to the first marker group G1, and determine whether the second marker group G2 conforms to the second bounding box F2 in accordance with the continuity. If the high continuity is existed in the first marker group G1 and the second marker group G2, the second marker group G2 can belong to the shadow detection result of the first marker group G1. If the continuity in the first marker group G1 and the second marker group G2 is lower, the second marker group G2 can be independent of the first marker group G1 and conforms to the second bounding box F2.

The fourth embodiment of the image identification method can acquire a first acceleration of the first marker group G1 and a second acceleration of the second marker group G2. If a difference between the first acceleration and the second acceleration is lower than a predefined threshold, the second marker group G2 can belong to the shadow detection result of the first marker group G1. If the difference between the first acceleration and the second acceleration is equal to or greater than the predefined threshold, the second marker group G2 can conform to the second bounding box F2.

In conclusion, the image identification method and the image surveillance apparatus of the present invention can utilize the object detecting function and the foreground detecting function to acquire the bounding box and the marker relevant to the target object within the surveillance image, and decide how to divide the plurality of markers into the first marker group composed of the specific markers and the second marker group composed of the excluded markers in accordance with an overlapped degree between the markers and the bounding box. The specific marker can be used to decide whether the target object within the first bounding box belongs to the moving object, and is no long used to compare with the target object within the second bounding box. The excluded marker may be the foreground variation resulted by the shadow of the target object corresponding to the specific marker, and is still compared with the second bounding box for determining whether the target object within the second bounding box is excluded or represents the correct detection result.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image identification method of decreasing identification error, the image identification method comprising:
   utilizing an object detecting function to generate a first bounding box and a second bounding box within a surveillance image;
   utilizing a foreground detecting function to generate a plurality of markers within the surveillance image;
   defining some specific markers of the plurality of markers which conform to the first bounding box as a first marker group and further defining other excluded markers which do not conform to the first bounding box as a second marker group;
   acquiring a first acceleration of the first marker group and a second acceleration of the second marker group;
   comparing the first acceleration with the second acceleration to determine whether the second marker group conforms to the second bounding box; and
   deciding whether the second bounding box belongs to an error of the object detecting function in accordance with a determination result.

2. The image identification method of claim 1, wherein generating the first bounding box comprises:
   drawing a rectangular bounding box around a target object within the surveillance image;
   drawing a contour of the target object; and
   setting a maximal combined range of the rectangular bounding box and the contour as the first bounding box.

3. The image identification method of claim 1, wherein generating the first bounding box comprises:
   drawing a first rectangular bounding box around a target object within the surveillance image;
   drawing a contour of the target object; and
   generating a second rectangular bounding box by moving at least one edge of the first rectangular bounding box to align with the contour and setting the second rectangular bounding box as the first bounding box.

4. The image identification method of claim 1, further comprising:
   utilizing a shadow detection function to identify whether the second marker group is relevant to the first marker group; and
   determining whether the second marker group conforms to the second bounding box in accordance with an identification result.

5. The image identification method of claim 1, further comprising:
   analyzing whether a vector of the first marker group is the same as or similar to a vector of the second marker group; and
   determining whether the second marker group conforms to the second bounding box in accordance with an analysis result.

6. The image identification method of claim 1, further comprising:
   analyzing continuity of the second marker group relative to the first marker group; and
   determining whether the second marker group conforms to the second bounding box in accordance with the continuity.

7. The image identification method of claim 1, further comprising:
   comparing a stationary period of the second bounding box with a predefined period; and
   determining the second bounding box belongs to the error of the object detecting function when the stationary period exceeds the predefined period.

8. The image identification method of claim 1, wherein deciding whether the second bounding box belongs to the error of the object detecting function comprises:
   comparing a marker number of the second marker group that conforms to the second bounding box with a threshold condition; and
   determining the second bounding box belongs to the error of the object detecting function when the marker number is smaller than the threshold condition.

9. The image identification method of claim 1, further comprising:
   classifying at least one marker of the first marker group that is located within the second bounding box into the second marker group when the first bounding box is partly overlapped with the second bounding box.

10. An image surveillance apparatus, comprising:
    an image receiver adapted to acquire a surveillance image; and
    an operation processor electrically connected to the image receiver, the operation processor being adapted to utilize an object detecting function to generate a first bounding box and a second bounding box within the surveillance image, utilize a foreground detecting function to generate a plurality of markers within the surveillance image, define some specific markers of the plurality of markers which conform to the first bounding box as a first marker group and further defining other excluded markers which do not conform to the first bounding box as a second marker group, acquire a first acceleration of the first marker group and a second acceleration of the second marker group, compare the first acceleration with the second acceleration to determine whether the second marker group conforms to the second bounding box, and decide whether the second bounding box belongs to an error of the object detecting function in accordance with a determination result.

11. The image surveillance apparatus of claim 10, wherein the operation processor is further adapted to draw a rectangular bounding box around a target object within the surveillance image, draw a contour of the target object, and set a maximal combined range of the rectangular bounding box and the contour as the first bounding box.

12. The image surveillance apparatus of claim 10, wherein the operation processor is further adapted to draw a first rectangular bounding box around a target object within the surveillance image, draw a contour of the target object, and generate a second rectangular bounding box by moving at least one edge of the first rectangular bounding box to align with the contour and setting the second rectangular bounding box as the first bounding box.

13. The image surveillance apparatus of claim 10, wherein the operation processor is further adapted to utilize a shadow detection function to identify whether the second marker group is relevant to the first marker group, and determine whether the second marker group conforms to the second bounding box in accordance with an identification result.

14. The image surveillance apparatus of claim 10, wherein the operation processor is further adapted to analyze whether a vector of the first marker group is the same as or similar to a vector of the second marker group, and determine whether the second marker group conforms to the second bounding box in accordance with an analysis result.

15. The image surveillance apparatus of claim 10, wherein the operation processor is further adapted to analyze continuity of the second marker group relative to the first marker group, and determine whether the second marker group conforms to the second bounding box in accordance with the continuity.

16. The image surveillance apparatus of claim 10, wherein the operation processor is further adapted to compare a stationary period of the second bounding box with a predefined period, and determine the second bounding box belongs to the error of the object detecting function when the stationary period exceeds the predefined period.

17. The image surveillance apparatus of claim 10, wherein the operation processor is further adapted to compare a marker number of the second marker group that conforms to the second bounding box with a threshold condition, and determine the second bounding box belongs to the error of the object detecting function when the marker number is smaller than the threshold condition.

18. The image surveillance apparatus of claim 10, wherein the operation processor is further adapted to classify at least one marker of the first marker group that is located within the second bounding box into the second marker group when the first bounding box is partly overlapped with the second bounding box.

* * * * *